(12) United States Patent
Mullsteff

(10) Patent No.: US 10,551,585 B2
(45) Date of Patent: Feb. 4, 2020

(54) FIBER OPTIC PATCHING SYSTEM

(71) Applicant: Tactical Deployment Systems, LLC, Richmond, VA (US)

(72) Inventor: David M. Mullsteff, Glen Allen, VA (US)

(73) Assignee: TACTICAL DEPLOYMENT SYSTEMS, LLC, Richmond, VA (US)

( * ) Notice: Subject to any disclaimer, the term of this patent is extended or adjusted under 35 U.S.C. 154(b) by 0 days.

(21) Appl. No.: 16/366,471

(22) Filed: Mar. 27, 2019

(65) Prior Publication Data
US 2019/0361188 A1    Nov. 28, 2019

Related U.S. Application Data

(63) Continuation of application No. 15/989,718, filed on May 25, 2018, now Pat. No. 10,281,672.

(51) Int. Cl.
*G02B 6/44*    (2006.01)
*H04Q 1/02*    (2006.01)

(52) U.S. Cl.
CPC ......... *G02B 6/4453* (2013.01); *G02B 6/4452* (2013.01); *H04Q 1/13* (2013.01); *H04Q 2201/804* (2013.01)

(58) Field of Classification Search
CPC ...... G02B 6/4453; G02B 6/4452; H04Q 1/13; H04Q 2201/804
USPC ........................................... 385/135
See application file for complete search history.

(56) References Cited

U.S. PATENT DOCUMENTS 9,841,574 B1 * 12/2017 Pilon .................... G02B 6/3897

\* cited by examiner

*Primary Examiner* — Jerry M Blevins
(74) *Attorney, Agent, or Firm* — Patentfile, LLC; Bradley C. Fach; Steven R. Kick

(57) ABSTRACT

A cassette may include a channel with a lock tab disposed within the channel. Each cassette may be adapted to receive and secure any type of data cable and cable connector. A chassis may include an alignment slot and a key which may extend away from the alignment slot, and the key may have a key aperture. The cassette may be coupled within the alignment slot by inserting the key into the channel so that the lock tab and key aperture are engaged together. Preferably, the portion of the key having the key aperture may be movable away from the portion of the cassette having the lock tab to disengage the lock tab and key aperture so that the cassette is able to be uncoupled from the alignment slot.

18 Claims, 17 Drawing Sheets

FIBER OPTIC PATCHING SYSTEM

CROSS REFERENCE TO RELATED APPLICATIONS

This application is a continuation of co-pending application Ser. No. 15/989,718 filed May 25, 2018.

FIELD OF THE INVENTION

This patent specification relates to the field of data cable patching systems. More specifically, this patent specification relates to a fiber optic data cable patching system configured to provide easy installation and cable routing for a plurality of cables.

BACKGROUND

Most of today's high-density data center "targeted" patching systems are configured to patch and organize a plurality of data cables. These existing patching systems typically have a cassette format that maximize chassis density, but they are not conducive to easy installation and cable routing through existing Latter Racks, Innerduct, and Raised Floor systems during the pulling of pre-terminated fiber optic trunk cables. Additionally, these existing patching systems utilize cumbersome vertical cassettes that do not allow for pre-termination of the cassettes or use pre-terminated cassettes that are large and bulky. Furthermore, existing patching systems often have a number of termination points throughout the cabling design which results in increased signal loss.

Therefore, a need exists for novel data cable patching systems. A further need exists for novel data cable patching systems which are conducive to easy installation and cable routing during the pulling of pre-terminated fiber optic trunk cables. There is also a need for novel data cable patching systems that do not utilize cumbersome and bulky cassettes. Finally, a need exists for novel data cable patching systems that are able to provide reduce signal loss by reducing the number of termination points throughout the cabling design.

BRIEF SUMMARY OF THE INVENTION

A fiber optic patching system is provided which is conducive to easy installation and cable routing during the pulling of pre-terminated fiber optic trunk cables. In some embodiments, system may include a cassette for receiving one or more data cables each having a cable connector. The cassette may be configured to be removably coupled to a chassis having an alignment slot and a key extending away from the alignment slot, and the key may have a key aperture. The cassette may include a body having a first vertical surface, a second vertical surface, a lower surface, and an upper surface. The first vertical surface, second vertical surface, lower surface, and upper surface may be disposed between a front end and a back end. A face plate may be coupled to the front end, and the face plate may have a front plate aperture adapted to receive one or more cable connectors. A back plate may be coupled to the back end, and the back plate may have a back plate aperture adapted to receive a portion of the one or more data cables. A channel may be coupled to the body, and a lock tab may be disposed within the channel. The cassette may be coupled within the alignment slot by inserting the key into the channel so that the lock tab and key aperture are engaged together.

In further embodiments, a fiber optic patching system may include a chassis for removably coupling a cassette having a channel with a lock tab disposed within the channel. The chassis may include a first divider and a second divider each coupled to a frame base. An alignment slot may be bounded by the first divider, second divider, and frame base. A key may extend away from the alignment slot, and the key may have a key aperture. The cassette may be coupled within the alignment slot by inserting the key into the channel so that the lock tab and key aperture are engaged together.

In further embodiments, the cassettes of the system may be configured with a generally square shaped front end, instead of the typical vertically elongated cassette design, which lends to a smaller profile during installation and helps reduce the cassette profile during installation. This system simplifies the installation process of pre-terminated trucked cassettes and as a result can reduce signal loss by reducing the number of termination points throughout the cabling design. The cassettes may be configured with front plates and back plates which may be adapted to receive and secure any type of data cable and cable connector.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
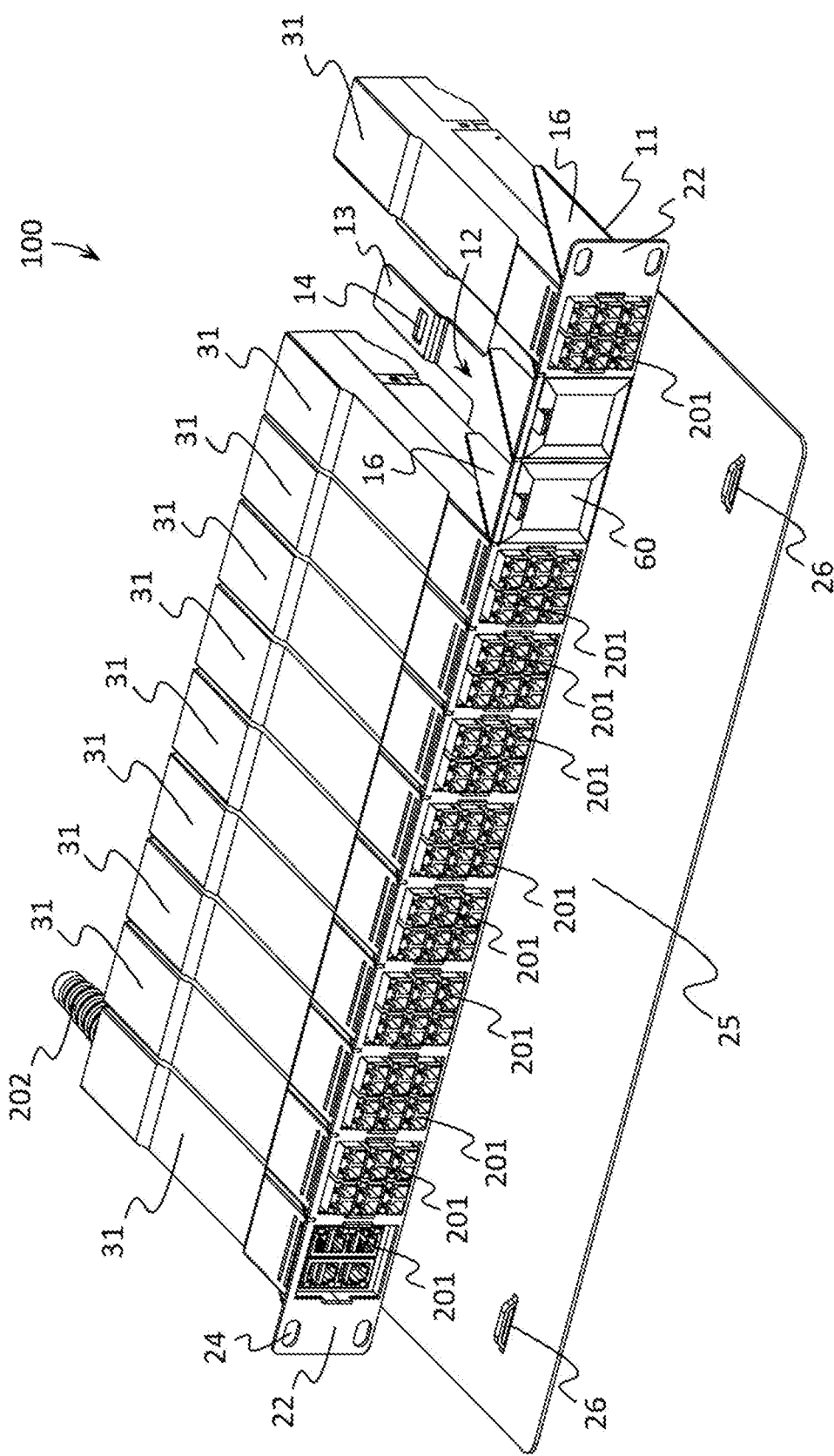
FIG. 1 depicts a top perspective view of an example of a fiber optic patching system according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

A new data cable patching system is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

Figure 2:
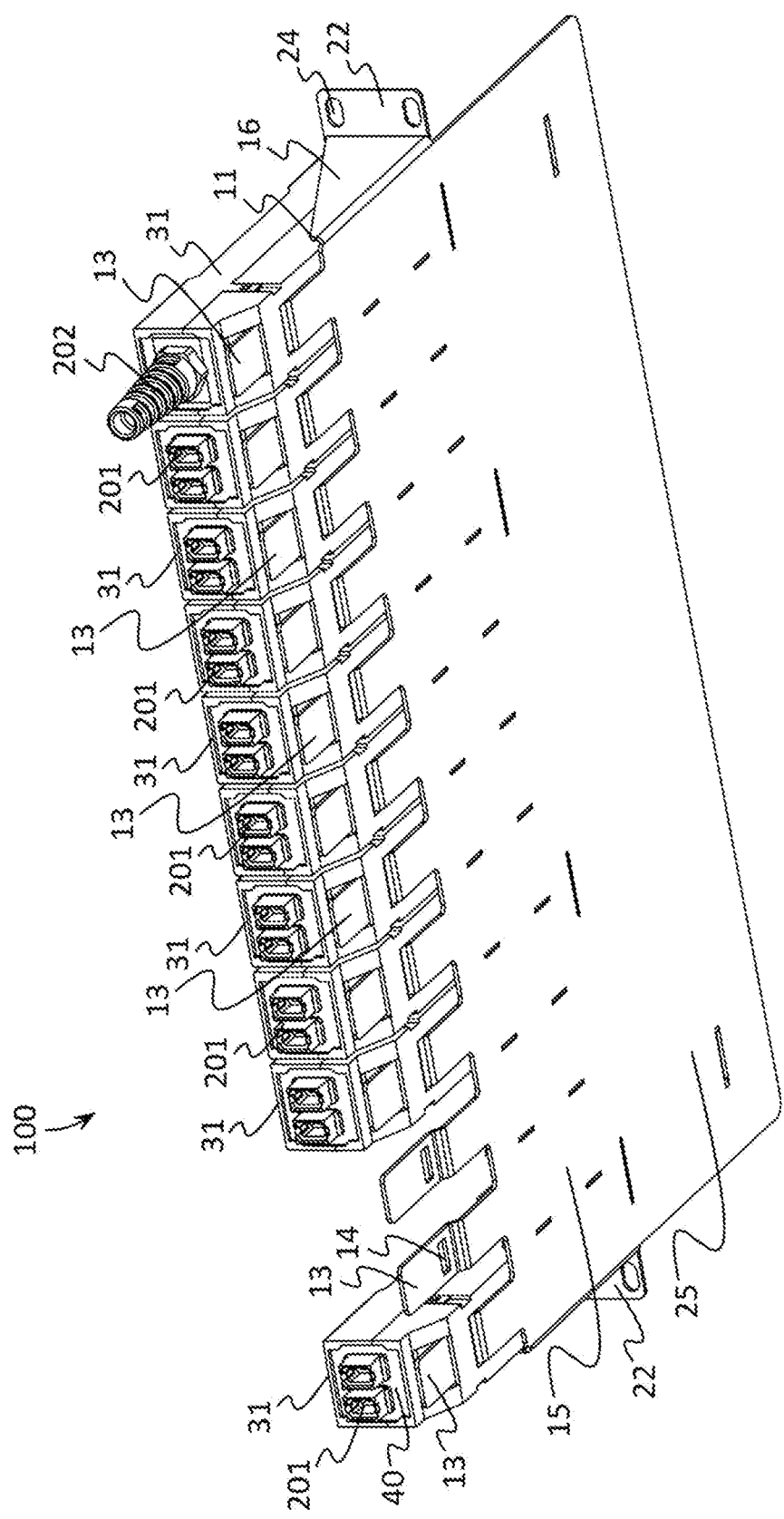
FIG. 2 illustrates a bottom perspective view of an example of a fiber optic patching system according to various embodiments described herein.

The present invention will now be described by example and through referencing the appended figures representing preferred and alternative embodiments. FIGS. 1 and 2 illustrate an example of a fiber optic patching system ("the system") 100 according to various embodiments. In preferred embodiments, the system 100 may comprise one or more cassettes 31 which may be removably coupled to a chassis 11. Each cassette may include a channel 32 with a lock tab 33 disposed within the channel 32. A chassis 11 may include one or more alignment slots 12 and a key 13 extending away from each alignment slot 12. Each key 13 may have a key aperture 14. A cassette 31 may be coupled within an alignment slot 12 by inserting the key 13 into the channel 31 so that the lock tab 33 and key aperture 14 are engaged together.

As perhaps best shown in FIGS. 3A-3E, in some embodiments, a chassis 11 may comprise a frame base 15 to which two or more dividers 16 may be coupled. Preferably, the frame base 15 and the dividers 16 may each be generally planar or flat in shape. The dividers 16 may be oriented generally perpendicular to the fame base 15. Optionally, two or more of the dividers 16 may be oriented generally parallel to each other, and preferably each of the dividers 16 of a chassis 11 may be oriented generally parallel to each other. The elements of the chassis 11 may be made from or may comprise durable materials such as various types of stamped sheet metal, plastics, carbon fiber, or any other generally rigid material.

An alignment slot 12 may be formed and bounded by two adjacent dividers 16, such as a first divider 16 and a second divider 16, and by portions of the frame base 15 extending between the two adjacent dividers 16. For example, thirteen dividers 16 may be coupled to a fame base 15 to form twelve alignment slots 12. In some embodiments, a first divider 16 and second divider 16 may be separated by a distance that is slightly greater than the distance between the vertical walls 34, 35, of a cassette 31 so that the cassette 31 may be snugly or received in the alignment slot 12 between the two adjacent dividers 16.

Figure 3A:
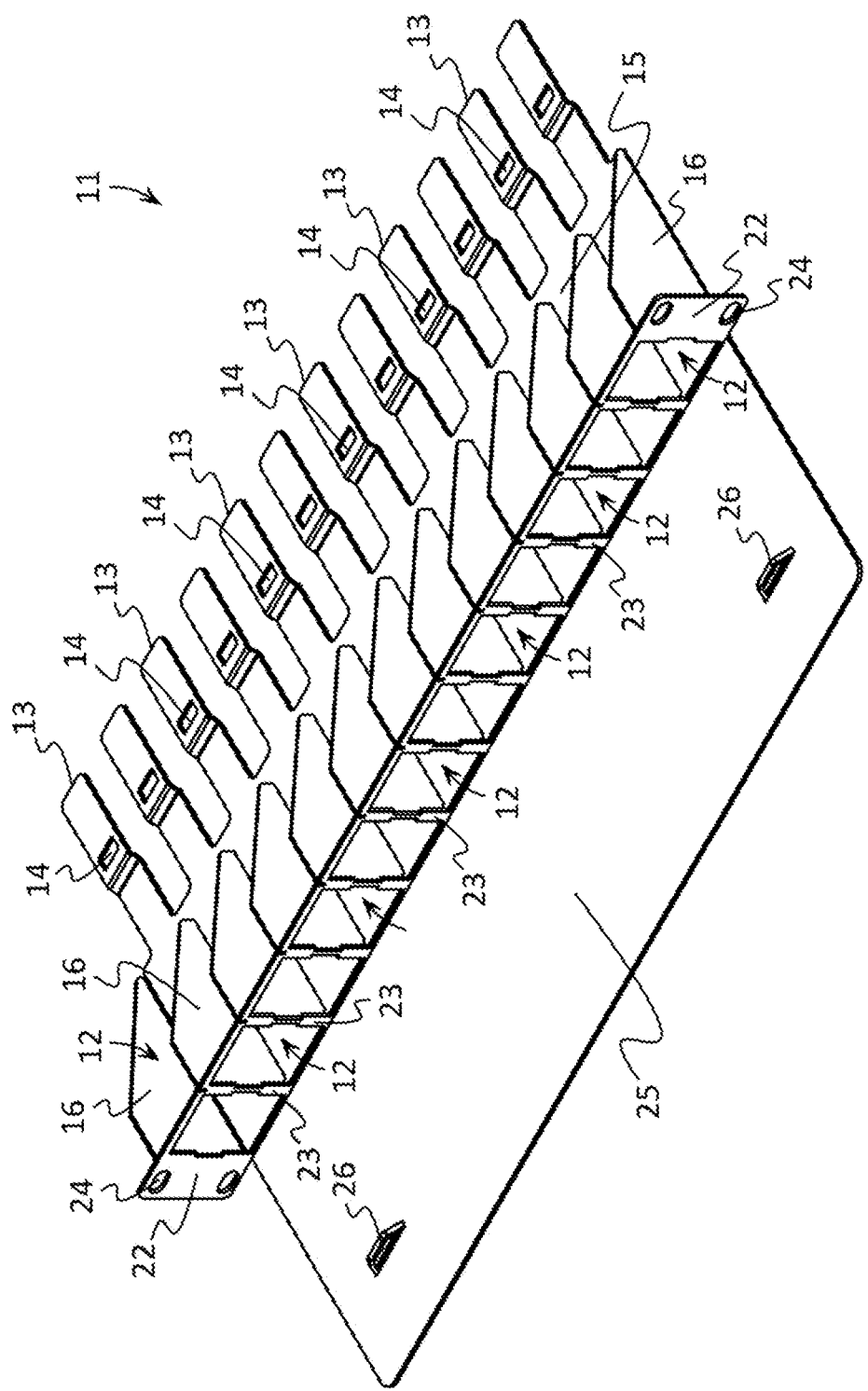
FIG. 3A shows a top perspective view of an example of a chassis according to various embodiments described herein.
Figure 3B:
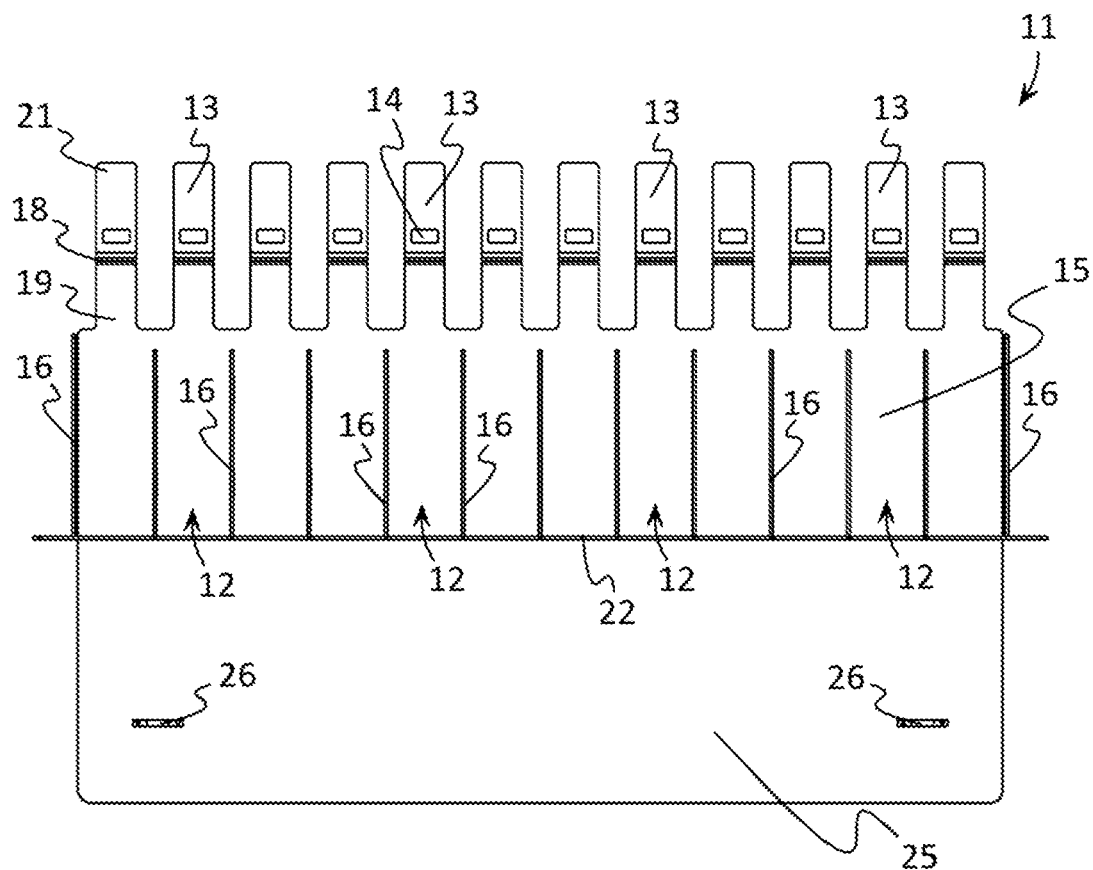
FIG. 3B depicts a top plan view of an example of a chassis according to various embodiments described herein.
Figure 3C:
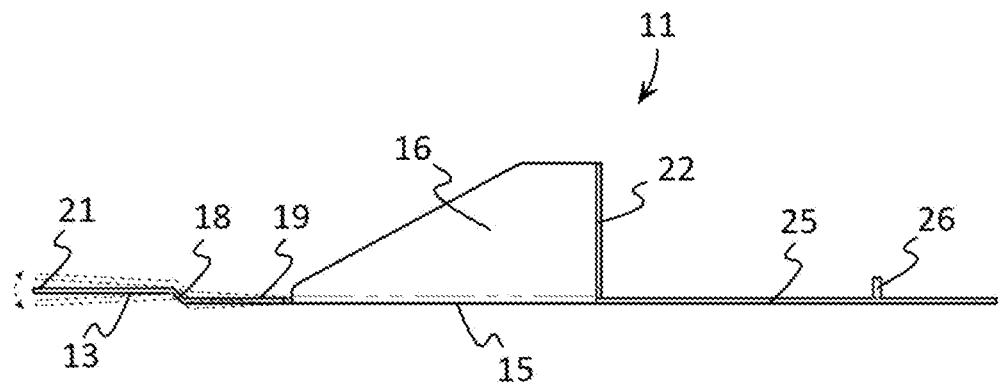
FIG. 3C illustrates a side elevation view of an example of a chassis according to various embodiments described herein.
Figure 3D:
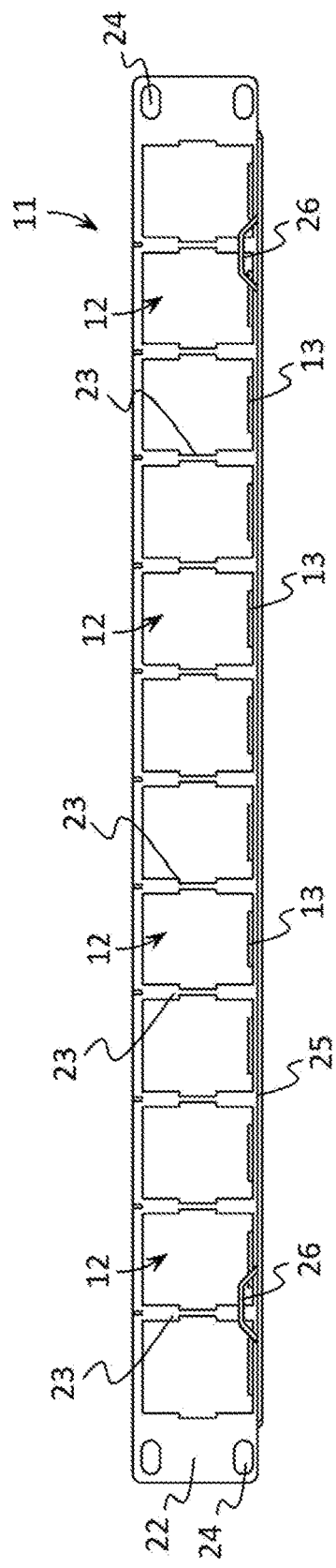
FIG. 3D shows a front elevation view of an example of a chassis according to various embodiments described herein.
Figure 3E:
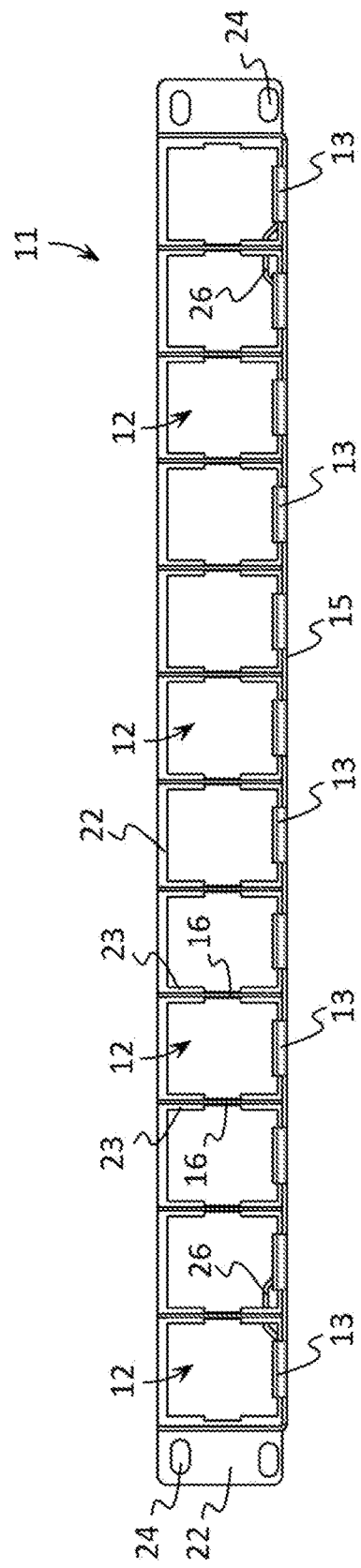
FIG. 3E depicts a rear elevation view of an example of a chassis according to various embodiments described herein.

The dividers 16 may be configured in any shape and size. In some embodiments, a divider 16 may be configured with a generally triangular shape. In preferred embodiments, a divider 16 may comprise a generally right trapezoid shape having two adjacent right angles and two parallel sides as shown in FIGS. 3A and 3C. In other embodiments, a divider 16 may comprise a generally square shape, half circle shape, rectangular shape, or any other shape.

The chassis 11 may comprise one or more keys 13 which may be coupled to, optionally by being integrally formed with, the frame base 15. In some embodiments, a key 13 may be coupled to a frame base 15 so that the key 13 may extend away from an alignment slot 12 of the chassis 11. In preferred embodiments, each key 13 may be coupled to a frame base 15 so that each key 13 may extend away from a respective alignment slot 12 of the chassis 11. In further preferred embodiments, the chassis 11 may comprise a key 13 extending away from each alignment slot 12.

A key 13 may be configured in any shape and size. Preferably, a key 13 may comprise a generally rectangular and planar shape. Optionally, a key 13 may comprise an angled portion 18 which may separate a proximal portion 19 from a distal portion 21. The proximal portion 19 of each key 13 may be coupled to the frame base 15, while the distal portion 21 of each key 13 may be farthest from the frame base 15. In preferred embodiments, the angled portion 18 may allow a distal portion 21 to be positioned above the proximal portion 19 while allowing the proximal portion 19 and distal portion 21 to be generally parallel to each other. In other embodiments, an angled portion 18, proximal portion 19, and/or a distal portion 21 may be curved or configured in any other shape.

Each key 13 may comprise a key aperture 14 which may be positioned anywhere on the key 13. In some embodiments, a key aperture 14 may be disposed on the distal portion 21 of the key 13. In further embodiments, all or portions of a key 13 may be movable relative to the frame base 15 as shown in FIG. 3C. In preferred embodiments, the portion of the key 13 having the key aperture 14 may be movable relative to the frame base 15. Optionally, the key 13 and/or frame base 15 may be made from a flexible material, such as a sheet of plastic or metal, which may allow the portion of the key 13 having the key aperture 14 to be movable relative to the frame base 15. In other embodiments, any movable coupling may be used to enable the portion of the key 13 having the key aperture 14 to be movable relative to the frame base 15, such as any type of hinge or movable fastener. By being movable, the key aperture 14 may be moved into and out of contact with the lock tab 33 of a cassette 31 that is received in the respective alignment slot 12 of the key 13.

In some embodiments, the chassis 11 may comprise a face plate 22 which may be coupled to one or more dividers 16, frame base 15, or other element of the chassis 11. A face plate 22 may comprise a number of gates 23, in which each gate 23 may form and bound the entrance of an alignment slot 12 opposite the key 13 of the alignment slot 12. In some embodiments, a face plate 22 may comprise one or more, and preferably four securement apertures 24 which may be sized and shaped to receive one or more fasteners, such as screws, bolts, other threaded fasteners, or any other type of fastener, which may be used to secure the chassis 11, and therefore the system 100, to storage racks common in the data cabling industry.

In some embodiments, the chassis 11 may comprise a tray 25 which may be coupled to the frame base 15, such as by being integrally formed together. Generally, a tray 25 may function as a cable management and/or support tray for data cables that may extend from the one or more cassettes 31 which may be received in the alignment slots 12 of the chassis 11. A tray 25 may extend away from the alignment slots 12 so that the tray 25 may be opposingly positioned on the chassis 11 relative to the keys 13. A tray 25 may be configured in a generally rectangular shape as shown in FIGS. 1, 3A, 3B, or in any other shape. Optionally, a tray 25 may comprise a cleat 26 which may be used to receive fasteners which may be used to couple or organize cables that may extend from the one or more cassettes 31 which may be received in the alignment slots 12 of the chassis 11.

For example, a cleat 26 may extend above the tray 25 and form an aperture through which portions of a cable tie may be positioned through.

Turning now to FIGS. 1, 2, 4A-8A, 12A-13F, and 14 the system 100 may comprise one or more cassettes 31 which may secure one or more data cables 200 and their respective cable connectors 201 or couplings. In some embodiments, each alignment slot 12 may be configured to received one cassette 31, while in other embodiments, an alignment slot 12 may be configured to receive two or more cassettes 31.

Generally, a cassette 31 may comprise a body 34 which may be configured in any shape and size. Preferably, one or more of the cassettes 31 may comprise a generally rectangular prism shaped body 34. The body 34 may be formed by one or more sidewalls, for example with an upper sidewall 34A and a lower sidewall 34B. As another example, a body 34 may comprise four sidewalls. In some embodiments, the sidewalls 34A, 34B, may be coupled together via press fit fasteners, such as one or more snap apertures 43 which may be engaged to one or more snap protrusions 44. In alternative embodiments, the sidewalls 34A, 34B, may be coupled together via any suitable coupling method.

In some embodiments, the sidewalls 34A, 34B, may form a first vertical surface 35 and an opposing second vertical surface 36 in addition to a lower surface 37 and an upper surface 38. When a cassette 31 is received in an alignment slot 12, a lower surface 37 may be positioned in contact or proximate with the frame base 15, while the first vertical surface 35 may be positioned in contact or proximate with a first divider 16 and the second vertical surface 36 may be positioned in contact or proximate with a second divider 16.

Each cassette 31 may comprise a channel 32 which may be coupled to or disposed on the lower surface 37. A channel 32 may be shaped to slidably receive all or portions of a key 13. In preferred embodiments, a lock tab 33 may be disposed or positioned within the channel 32. Generally, a lock tab 33 may comprise a protrusion which preferably may be barb shaped and which may be generally complementary in shape to a key aperture 14 so that all or portions of the lock tab 33 may fit into the key aperture 14 thereby engaging the lock tab 33 to the key aperture 14. A barb shaped lock tab 33 may be slidably engaged and locked into a key aperture 14, until the key aperture 14 is moved away from the lock tab 33.

The cassettes 31 may each comprise one or more front plates 39 and back plates 40. In preferred embodiments, a cassette 31 may comprise two front plates 39 which may be coupled to the front end 41 of the cassette 31 and a back plate 40 which may be coupled to the back end 42 of the body 34 so that the front plate 39 and back plate 40 are opposingly positioned to each other. Two or more front plates 39 disposed in the front end 41 may facilitate in the alignment of cable connectors 201 positioned in the front plates 39. Any suitable coupling method may be used to couple the front plate(s) 39 to the body 34. For example, the body 34 may comprise a front channel 45 into which a front plate 39 may be received, and when the body 34 is coupled together, the front plate 39 may be retained in the front channel 45. In further embodiments, a front plate 39 may comprise one or more arms 51 which may be positioned within complementary shaped arm apertures 52 in the body 34 to position and/or couple the front plate 39 to the body 34. Similarly, any suitable coupling method may be used to couple the back plate(s) 40 to the body 34. For example, the body 34 may comprise a back channel 46 into which a back plate 40 may be received, and when the body 34 is coupled together, the back plate 40 may be retained in the back channel 46.

As shown in FIGS. 8A-9D, a front plate 39 may comprise one or more front plate apertures 53 which may receive and position one or more cable connectors 201 as shown in FIGS. 4A, 4C, 4D, and 12A-12F. Preferably, a front plate aperture 53 may be configured with a generally rectangular shape, although a front plate aperture 53 may be configured with a round shape or any other shape.

Figure 8A:
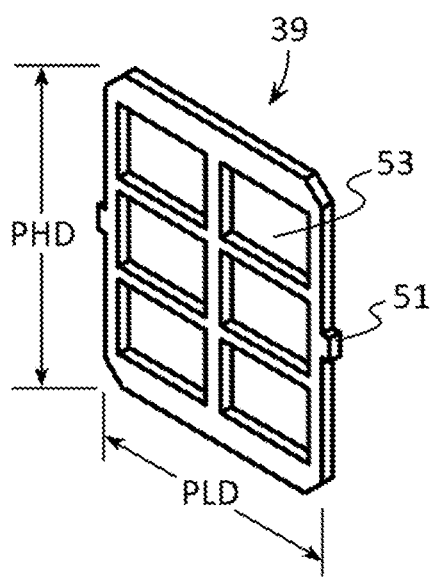
FIG. 8A illustrates a perspective view of an example of a front plate according to various embodiments described herein.
Figure 12A:
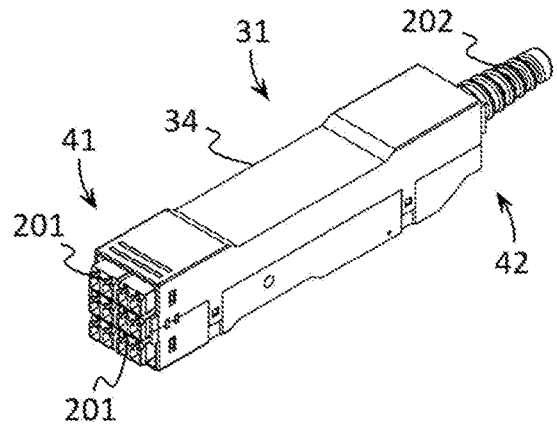
FIG. 12A shows a front perspective view of another example of a cassette according to various embodiments described herein.
Figure 12B:
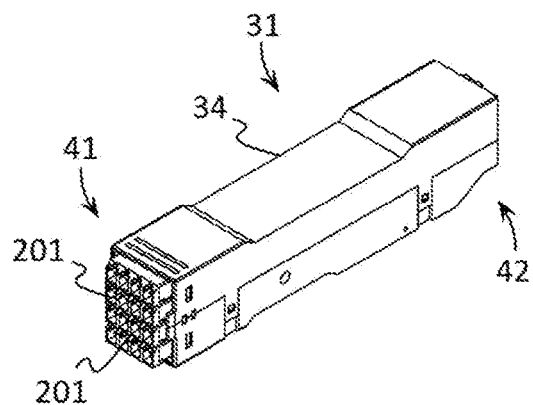
FIG. 12B depicts a front perspective view of a further example of a cassette according to various embodiments described herein.
Figure 12C:
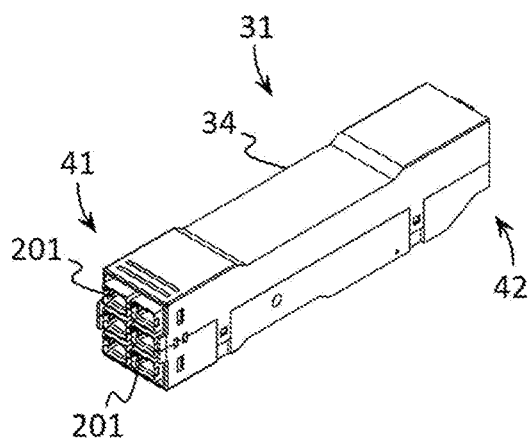
FIG. 12C illustrates a front perspective view of yet another example of a cassette according to various embodiments described herein.
Figure 12D:
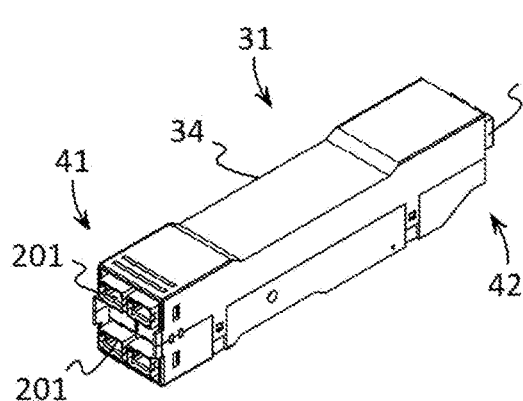
FIG. 12D shows a front perspective view of yet a further example of a cassette according to various embodiments described herein.

FIG. 8A shows an example of a front plate 39 having six rectangular front plate apertures 53 which may be suitable for receiving 6× LC Duplex type cable connectors 201 (FIG. 12A), 6× SC Simplex type cable connectors 201, and 6×MTP/MPO type cable connectors 201 (FIG. 12C).

Figure 8B:
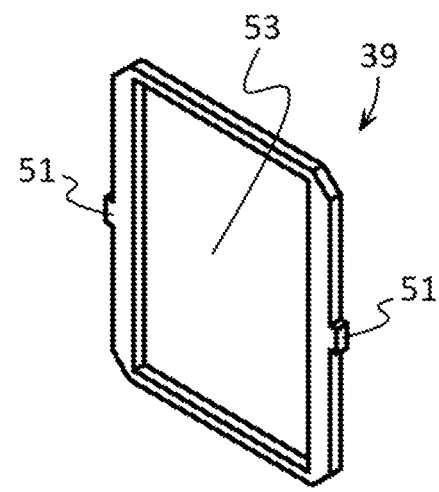
FIG. 8B shows a perspective view of another example of a front plate according to various embodiments described herein.
Figure 12E:
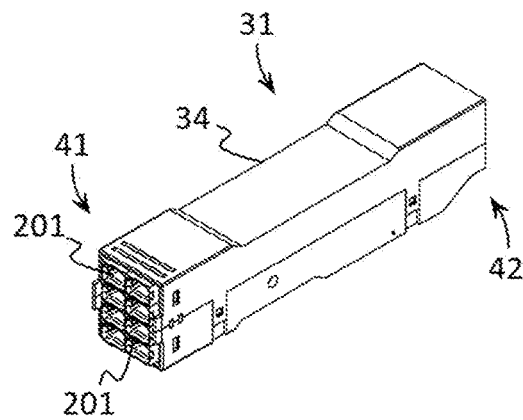
FIG. 12E depicts a front perspective view of still another example of a cassette according to various embodiments described herein.

FIG. 8B illustrates an example of a front plate 39 having one rectangular front plate aperture 53 which may be suitable for receiving 4× LC Quad type cable connectors 201, 4× SC Simplex type cable connectors 201, 4×MTP/MPO feedthrough type cable connectors 201 (FIG. 12D), 8 port LC duplex type cable connectors 201 (FIG. 12B), and 4×MTP duplex type cable connectors 201 (FIG. 12E).

Figure 8C:
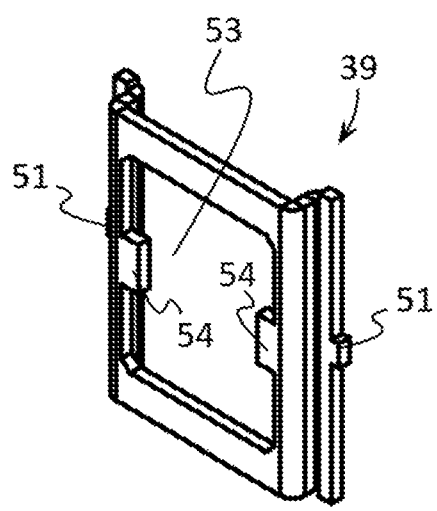
FIG. 8C depicts a perspective view of a further example of a front plate according to various embodiments described herein.
Figure 8D:
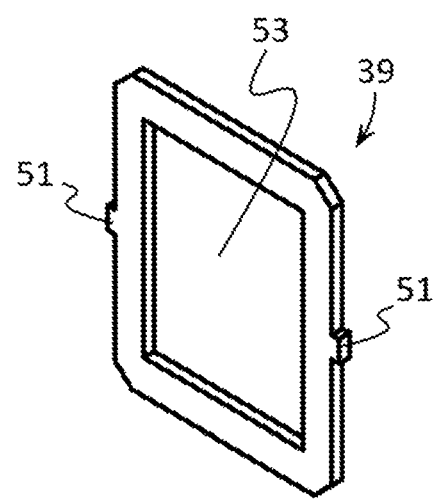
FIG. 8D illustrates a perspective view of yet another example of a front plate according to various embodiments described herein.
Figure 12F:
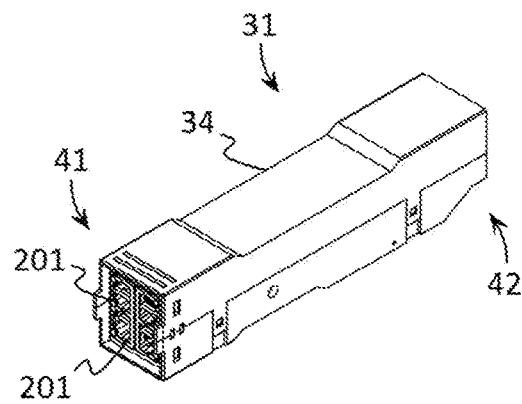
FIG. 12F illustrates a front perspective view of still a further example of a cassette according to various embodiments described herein.

FIG. 8C illustrates an example of a first front plate 39 having two connector arms 54 within a rectangular shaped front plate aperture 53, and FIG. 8D depicts an example of a second front plate 39 having a rectangular shaped front plate aperture 53 in which the two front plates 39 may be sequentially coupled to the front end 41 of a cassette 31 (with the first front plate 39 farthest from the back end 42) which may be suitable for receiving a 4 port RJ-45 type cable connectors 201 (FIG. 12F). In alternative embodiments, a cassette 31 may comprise one or more front plates 39 having one or more front plate apertures 53 which may be sized and shaped to receive one or more of any other type of cable connectors 201.

As shown in FIGS. 11A-11D, a back plate 40 may comprise one or more back plate apertures 55 which may receive and position one or more cable connectors 201, cable strain relief devices 202 (such as a Heyco Strain relief or other type of cable strain relief device), or other component of a data cable 200 as shown in FIGS. 4B, 4C, 4E, and 13A-13F.

Figure 11A:
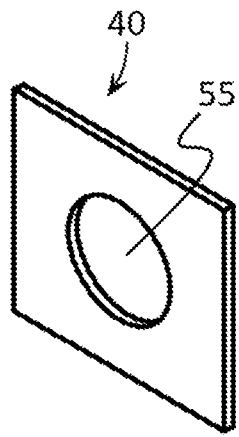
FIG. 11A illustrates a perspective view of an example of a back plate according to various embodiments described herein.
Figure 13A:
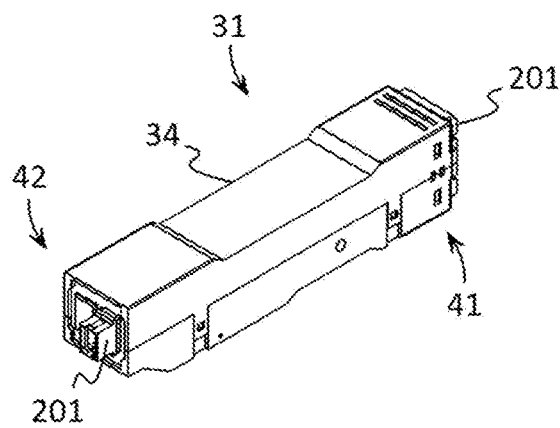
FIG. 13A shows a back perspective view of another example of a cassette according to various embodiments described herein.
Figure 13B:
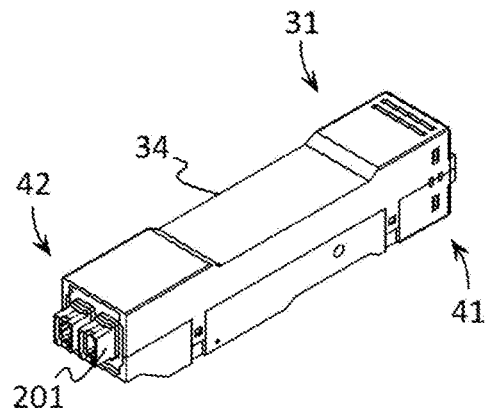
FIG. 13B depicts a back perspective view of a further example of a cassette according to various embodiments described herein.
Figure 13C:
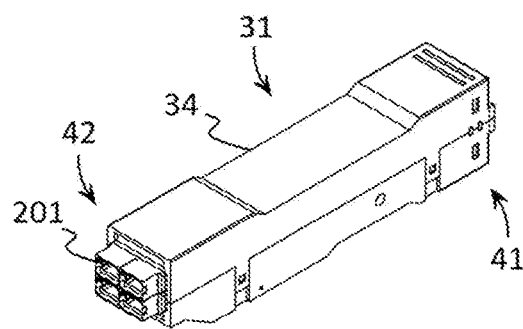
FIG. 13C illustrates a back perspective view of yet another example of a cassette according to various embodiments described herein.
Figure 13D:
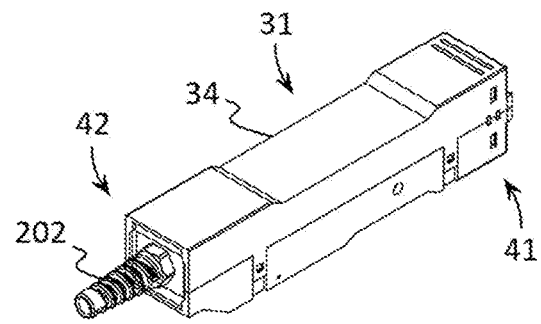
FIG. 13D shows a back perspective view of yet a further example of a cassette according to various embodiments described herein.
Figure 13E:
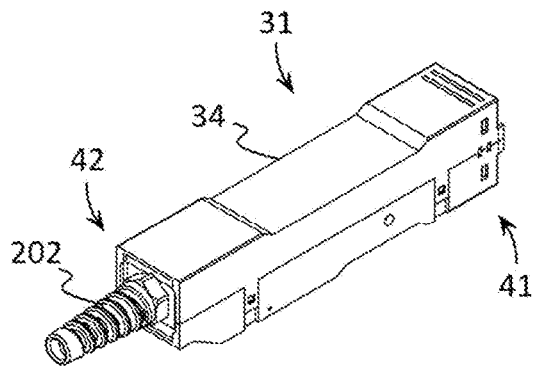
FIG. 13E depicts a back perspective view of still another example of a cassette according to various embodiments described herein.

FIG. 11A shows an example of a back plate 40 having a round back plate aperture 55 which may be sized to receive a data cable 200 having a relatively smaller cylindrical cable strain relief device 202 (FIG. 13D) or a relatively larger cylindrical cable strain relief device 202 (FIG. 13E).

Figure 11B:
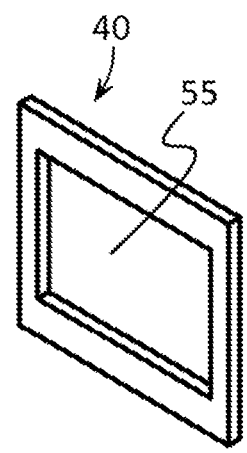
FIG. 11B shows a perspective view of another example of a back plate according to various embodiments described herein.

FIG. 11B depicts an example of a back plate 40 having a relatively larger back plate aperture 55 which may be suitable for receiving 2×MTP duplex type cable connectors 201 (FIG. 13C).

Figure 11C:
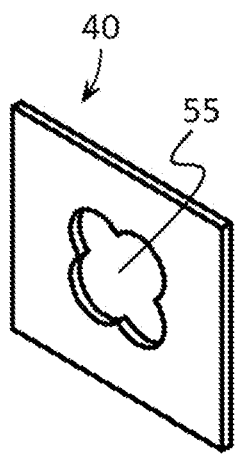
FIG. 11C depicts a perspective view of a further example of a back plate according to various embodiments described herein.
Figure 13F:
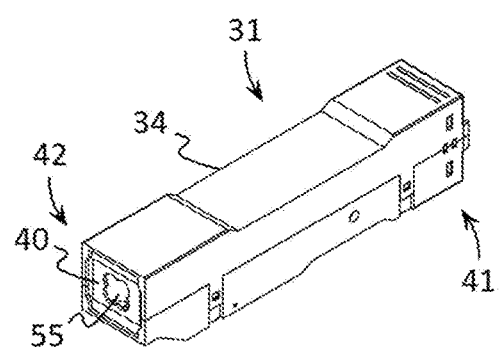
FIG. 13F illustrates a back perspective view of still a further example of a cassette according to various embodiments described herein.

FIG. 11C illustrates an example of a back plate 40 having a four-lobed shaped back plate aperture 55 which may be suitable for receiving 4×CAT 5/CAT 6 RJ-45 Direct Connect type cable connectors 201 (FIG. 13F).

Figure 11D:
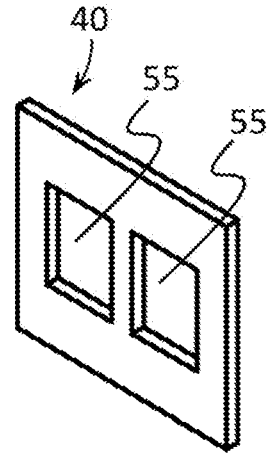
FIG. 11D illustrates a perspective view of yet another example of a back plate according to various embodiments described herein.

FIG. 11D illustrates an example of a back plate 40 having two rectangular shaped back plate apertures 55 which may be suitable for receiving one or two MTP Simplex type cable connectors 201 (FIGS. 13A and 13B, respectively).

Figure 4A:
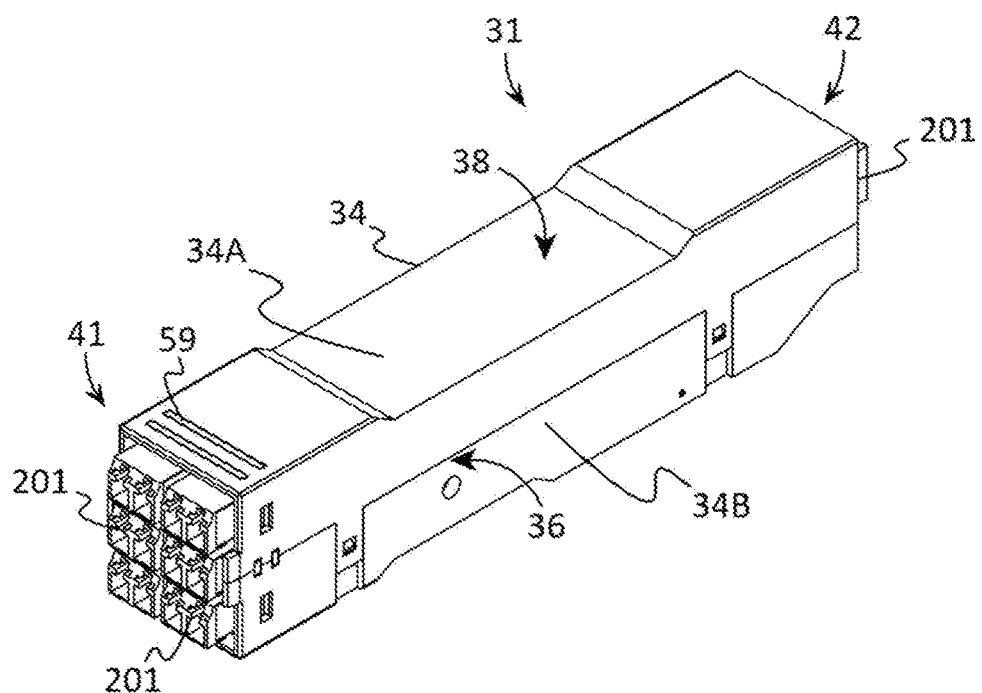
FIG. 4A illustrates a front perspective view of an example of a cassette according to various embodiments described herein.
Figure 4B:
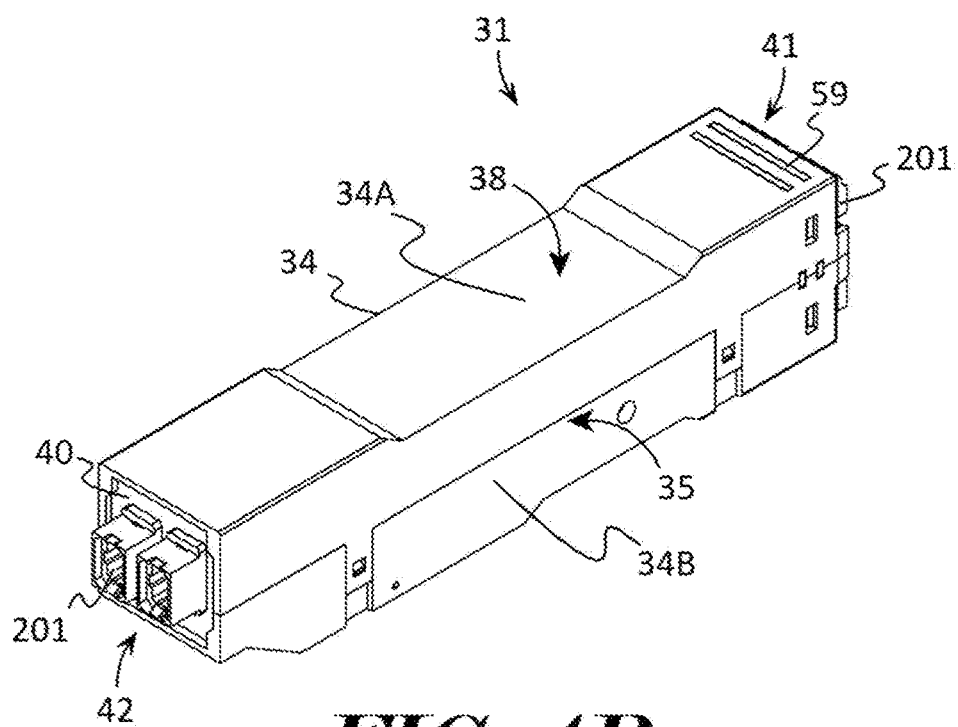
FIG. 4B shows a rear perspective view of an example of a cassette according to various embodiments described herein.
Figure 4C:
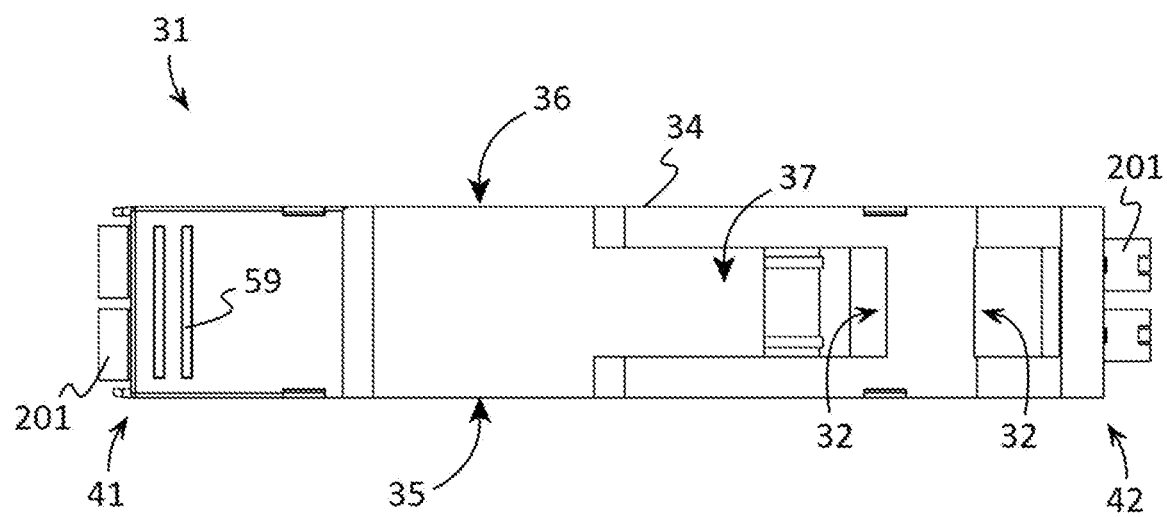
FIG. 4C depicts a bottom plan view of an example of a cassette according to various embodiments described herein.
Figure 4D:
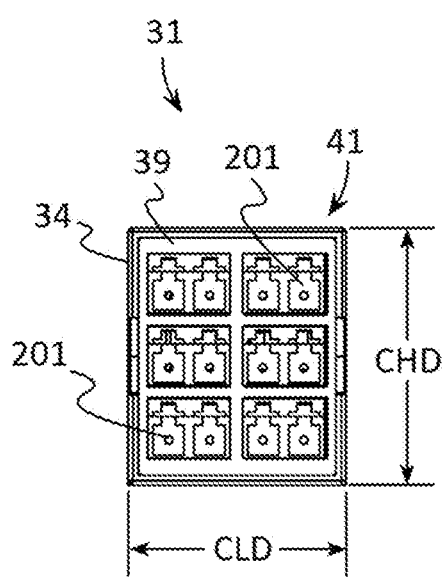
FIG. 4D illustrates a front elevation view of an example of a cassette according to various embodiments described herein.
Figure 4E:
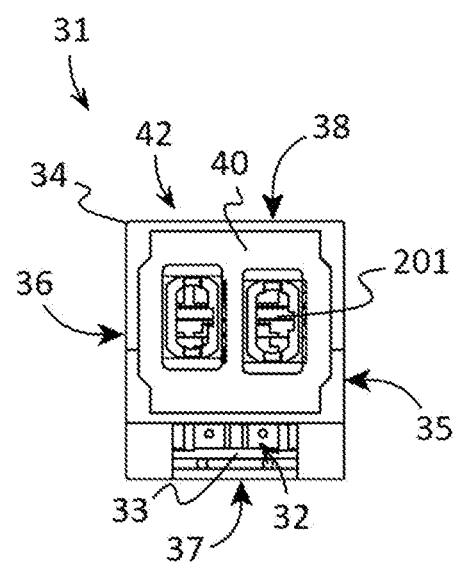
FIG. 4E shows a rear elevation view of an example of a cassette according to various embodiments described herein.

In preferred embodiments, the cassette 31 may comprise a front end 41 which may be generally square shaped. The cassette 31 may comprise a height dimension (CHD) and a length dimension (CLD) as shown in FIG. 4D, and the HD and LD may be approximately equal to each other thereby enabling the front end 41 of the cassette 31 to be generally square shaped. In some embodiments, HD and LD may be approximately equal by the HD being between 99% and 101% of LD. In other embodiments, HD and LD may be approximately equal by the HD being between 95% and 105% of LD. In further embodiments, HD and LD may be approximately equal by the HD being between 90% and 110% of LD. In preferred embodiments, HD and LD may be approximately equal by the HD being approximately 118% of LD. In further preferred embodiments, HD and LD may be approximately equal by the HD being between 115% and 120% of LD. In still further preferred embodiments, HD and LD may be approximately equal by the HD being between 110% and 125% of LD. In further embodiments, CHD may be approximately 1.61 inches and CLD may be approximately 1.36 inches. In further embodiments, CHD may be between 1.5 inches and 1.7 inches and CLD may be approximately 85 percent of CHD. In still further embodiments, CHD may be between 1.3 inches and 1.9 inches and CLD may be between 80 and 90 percent of CHD.

In some embodiments, the cassette 31 may comprise a front plate 39 which may be generally square shaped. The front plate 39 may comprise a height dimension (PHD) and a length dimension (PLD) as shown in FIG. 8A, and the PHD and PLD may be approximately equal to each other thereby enabling the front plate 39 of the cassette 31 to be generally square shaped. In some embodiments, PHD and PLD may be approximately equal by the PHD being between 99% and 101% of PLD. In other embodiments, PHD and PLD may be approximately equal by the PHD being between 95% and 105% of PLD. In further embodiments, PHD and PLD may be approximately equal by the PHD being between 90% and 110% of PLD. In preferred embodiments, PHD and PLD may be approximately equal by the PHD being approximately 118% of PLD. In further preferred embodiments, PHD and PLD may be approximately equal by the PHD being between 115% and 120% of PLD. In still further preferred embodiments, PHD and PLD may be approximately equal by the PHD being between 110% and 125% of PLD.

Figure 5:
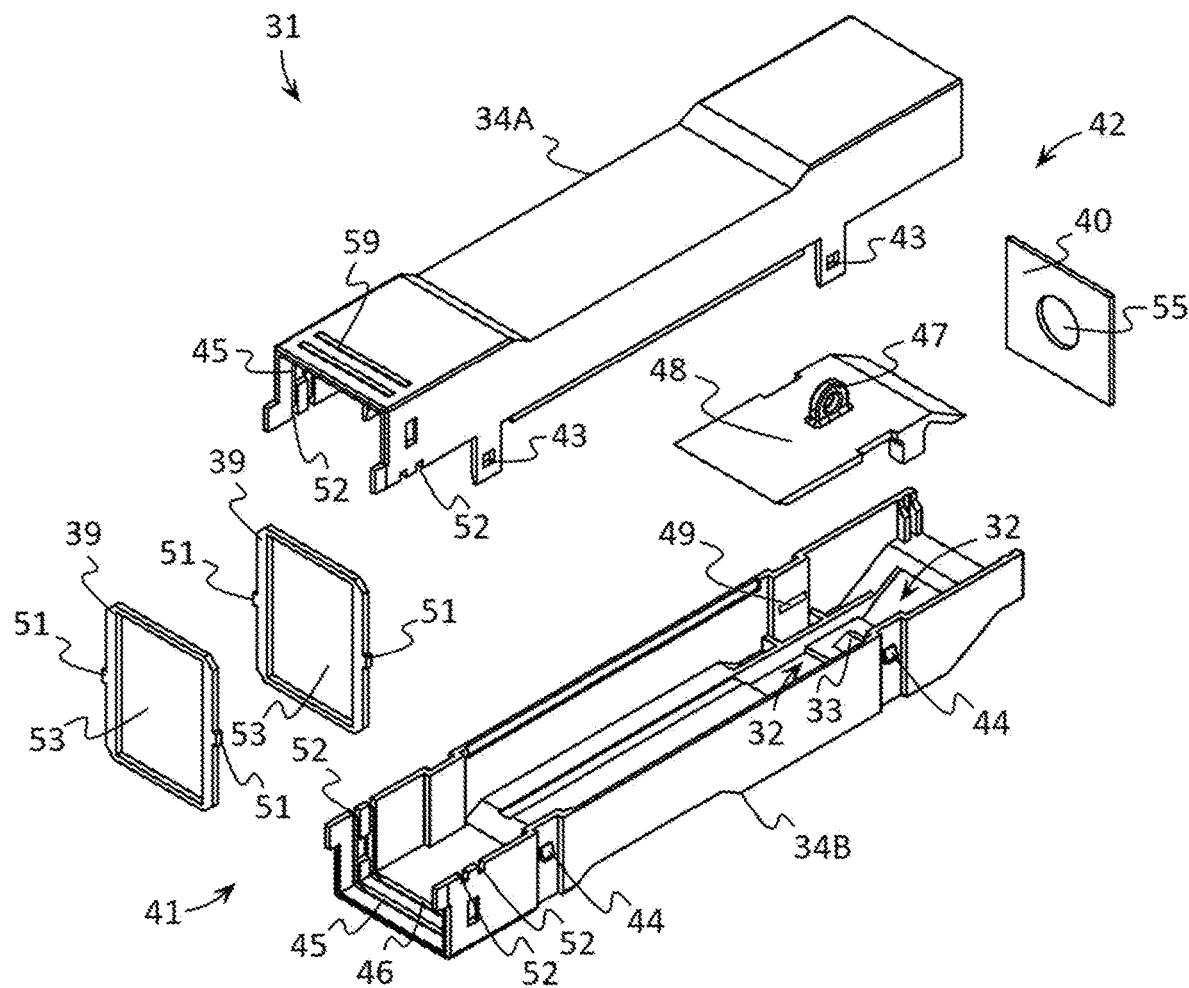
FIG. 5 depicts a perspective exploded view of an example of a cassette according to various embodiments described herein.
Figure 7:
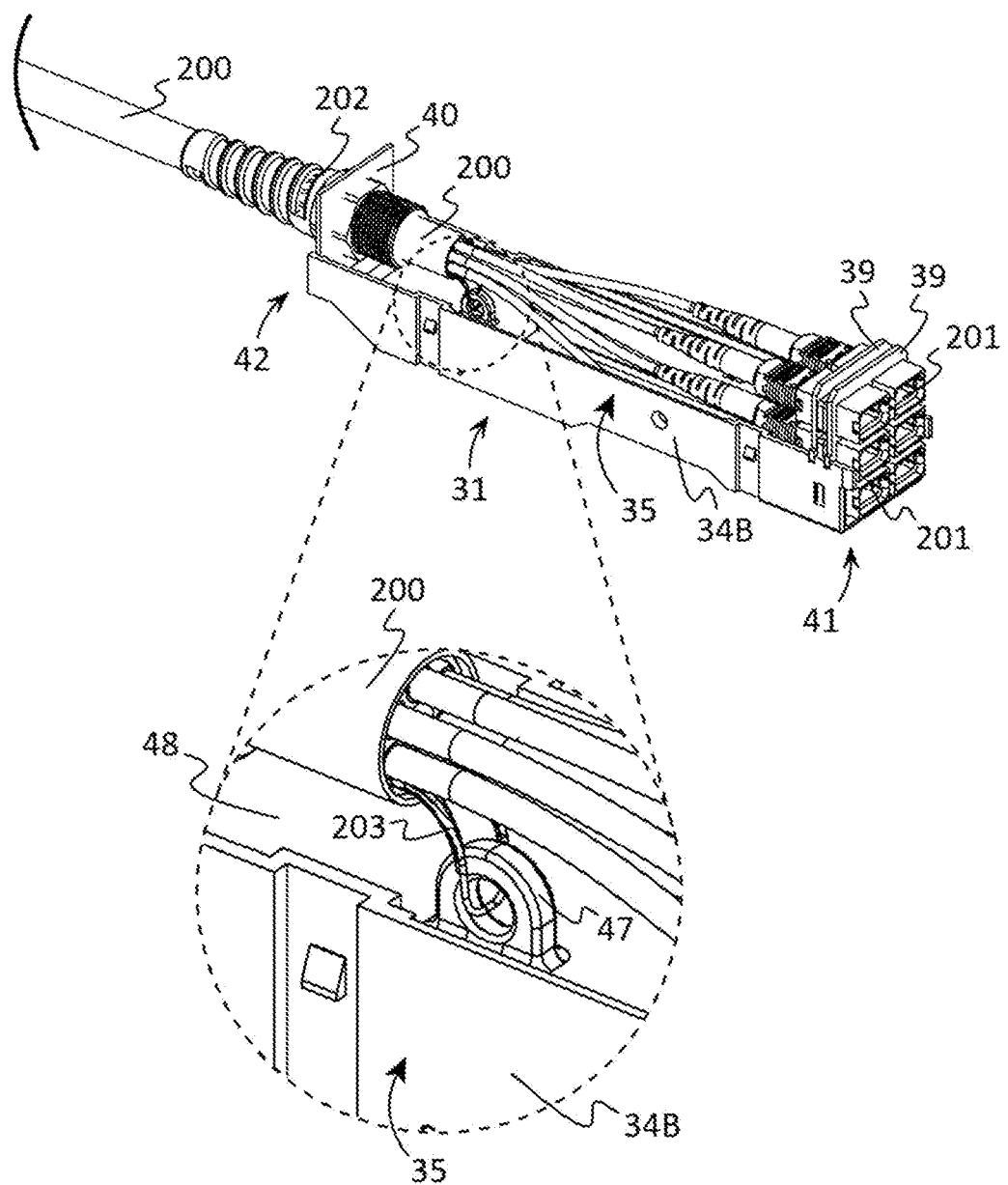
FIG. 7 shows a front perspective view of an example of a cassette with an upper sidewall removed in which the cassette has received a data cable and cable connectors according to various embodiments described herein.

Illustrated in FIGS. 5 and 7, in some embodiments, a cassette 31 may comprise a strain relief anchor 47. Optionally, a strain relief anchor 47 may be coupled to or disposed on an anchor base 48 which may be coupled to the body 34 via a press fit or snap fit barb tab 49, via one or more pins which may be received in complementary shaped pin apertures, with adhesive, or with any other coupling method. Preferably, a strain relief anchor 47 and an anchor base 48 may be disposed within the body 34. A strain relief anchor 47 may comprise a structure which may function as an internal strain relief eye ring which may optionally be used in conjunction with a pulling/reinforcement cable 203 (such as fiber optic cable Kevlar), or which may optionally be loaded with internal fiber harnesses connected via a separate terminated trunk cable. In other embodiments, a strain relief anchor 47 may be configured to receive a Heyco Strain relief or other type of cable strain relief device which may prevent the cable connectors 201 from being pulled out or otherwise dislodged from the front end 41 of a cassette 31.

Figure 6:
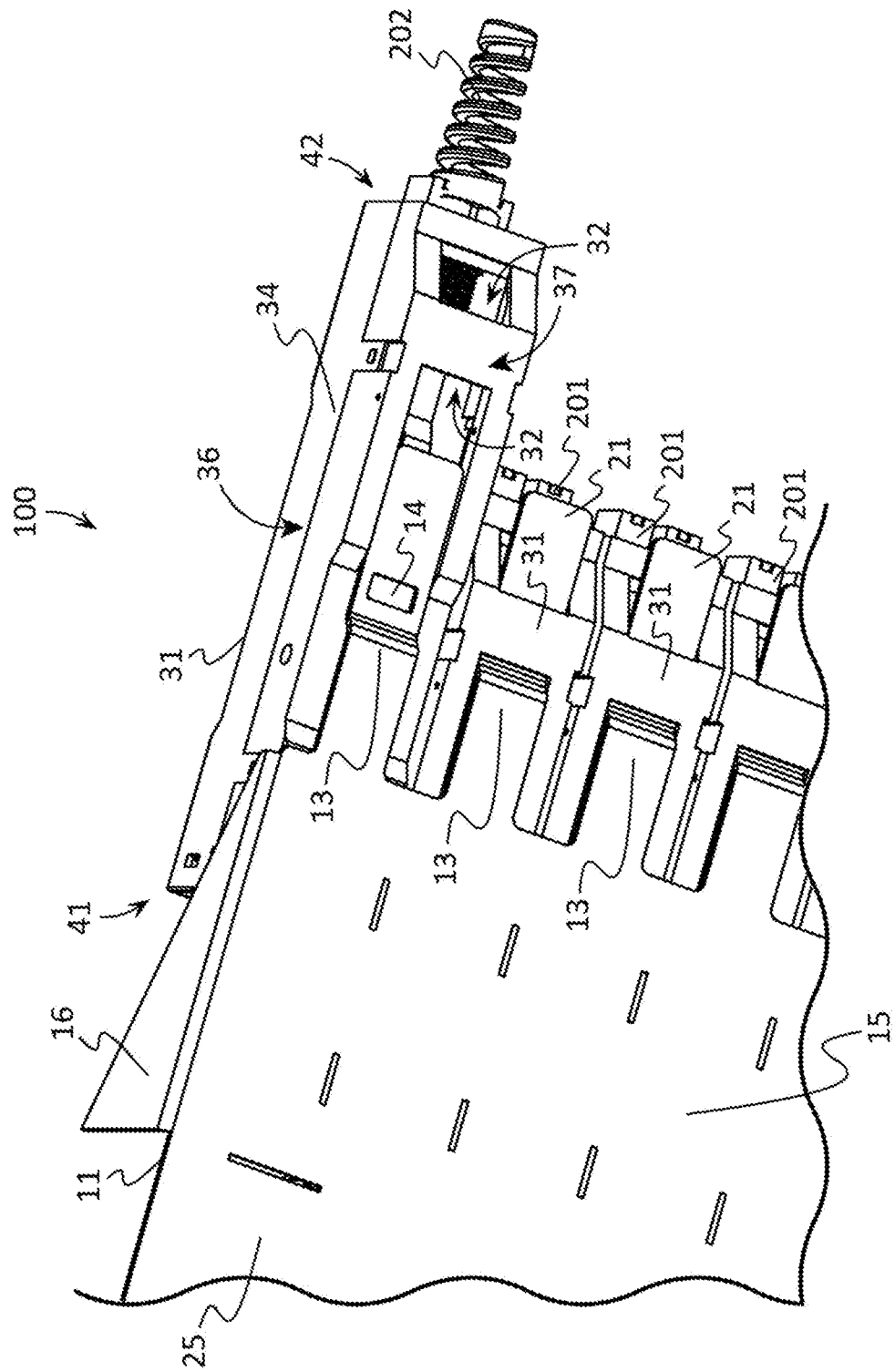
FIG. 6 illustrates a bottom view of an example of a cassette and a chassis according to various embodiments described herein.

As perhaps best shown in FIG. 6, in some embodiments, a cassette 31 may be secured or coupled to the chassis 11 via engagement between a lock tab 33 and a key aperture 14. In preferred embodiments, a cassette 31 may be secured or coupled to the chassis 11 via engagement between a lock tab 33 of a cassette 31 and a key aperture 14 of a key 13. A cassette 31 may be inserted into an alignment slot 12 of a chassis 11 so that a key 13 may enter into the channel 32 of the cassette 31. The cassette 31 may be inserted preferably until the front end 41 is positioned in contact with or proximate to the face plate 22 and until the lock tab 33 is engaged to the key aperture 14 (by the lock tab 33 being inserted into the key aperture 14). The engagement of the lock tab 33 and key aperture 14 may frictionally and/or mechanically prevent the cassette 31 from being pulled out of the alignment slot 12. In further embodiments, in order to disengage the lock tab 33 and key aperture 14 and separate the cassette 31 from the chassis 11, the portion of the key 13 having the key aperture 14 may be movable away from the portion of the cassette 31 having the lock tab 33 to separate and disengage the lock tab 33 and key aperture 14 so that the cassette 31 is able to be uncoupled from the alignment slot 12. In preferred embodiments, the distal portion 21 of the key 13 may be moved up or towards the cassette body 34 in order to separate and disengage the lock tab 33 and key aperture 14 so that the cassette 31 is able to be uncoupled from the alignment slot 12. In alternative embodiments, the distal portion 21 of the key 13 may be moved down or away from the cassette body 34 in order to separate and disengage the lock tab 33 and key aperture 14 so that the cassette 31 is able to be uncoupled from the alignment slot 12.

Figure 9:
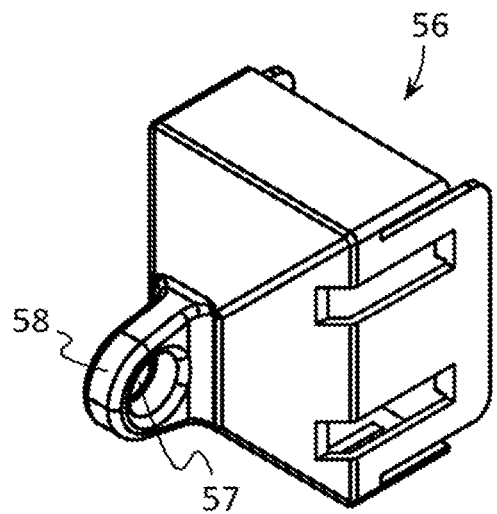
FIG. 9 shows a perspective view of an example of an eye cap according to various embodiments described herein.
Figure 10:
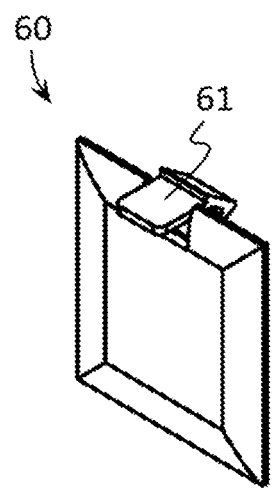
FIG. 10 depicts a perspective view of an example of a chassis blanking plug according to various embodiments described herein.
Figure 14:
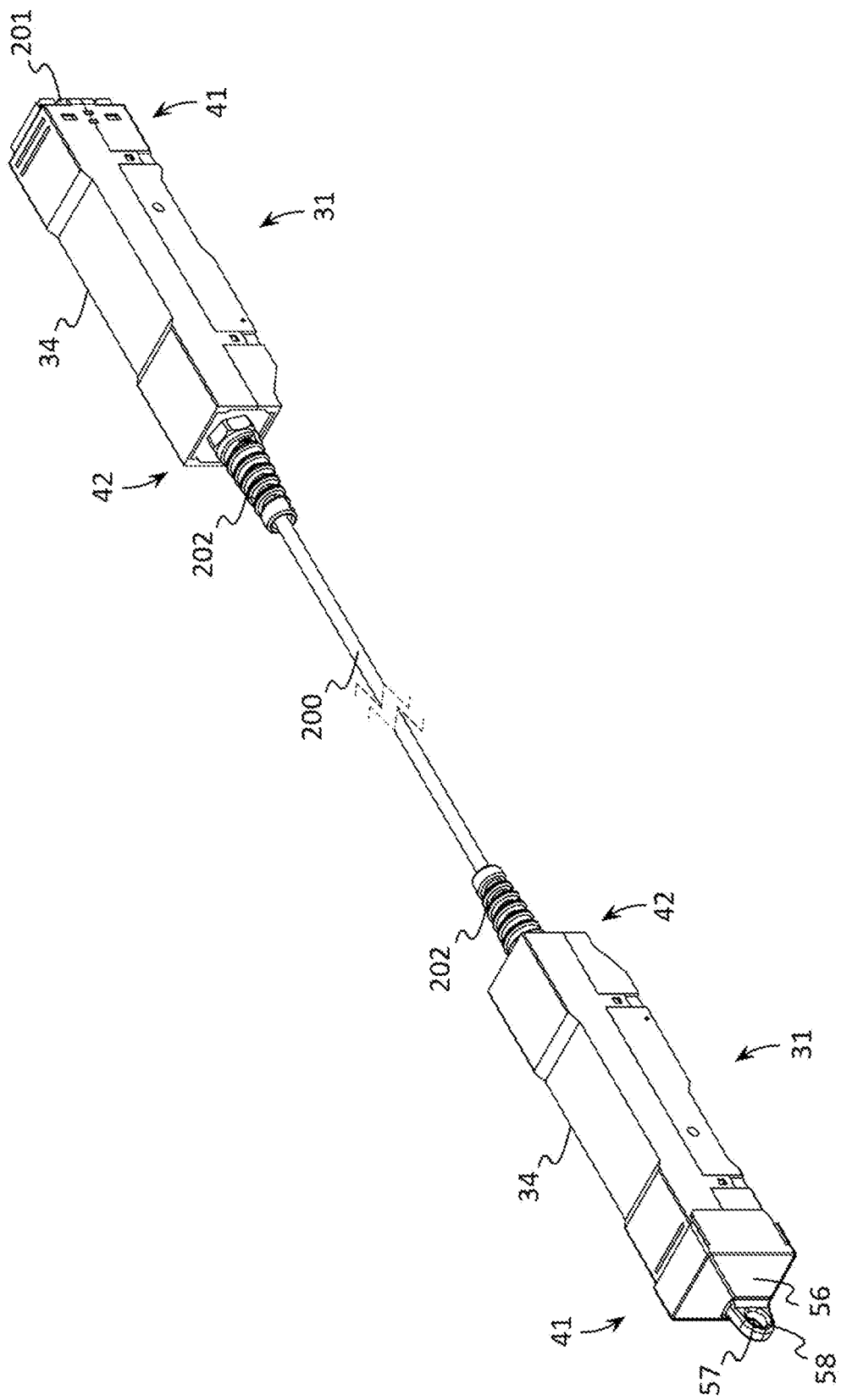
FIG. 14 shows a perspective view of an example of two cassettes coupled to opposing ends of a data cable according to various embodiments described herein.

In some embodiments, the system 100 may comprise an eye cap 56 as shown in FIGS. 9 and 14. An eye cap 56 may be removably coupled to a cassette 31, such as to the front end 41, and used to removably couple a pulling cable or other pulling device to the cassette 31 which may be used to pull a pre-terminated cassette 31 through ladder rack, Innerduct, raised floor, or any other installation application. An eye cap 56 may comprise a cap aperture 57 which may be formed by a cap arm 58. A cap aperture 57 and/or a cap arm 58 may be configured in any shape which may allow any type of pulling cable or other pulling device to be coupled to the eye cap 56. Optionally, a cassette 31 may comprise one or more cap ridges 59 which may be used to frictionally couple or to snap couple an eye cap 56 to the cassette 31 although any other suitable coupling method may be used.

In some embodiments, the system 100 may comprise a chassis blanking plug 60 which may be coupled to either the front end 41 and/or back end 42 of a cassette 31. A chassis blanking plug 60 preferably may be used to cover or seal an end 41, 42, of the cassette 31 to prevent dirt, contaminants, unwanted access, etc. to the end 41, 42, of the cassette 31 and any cable connecters 201 positioned at the end 41, 42, of the cassette 31. Optionally, a chassis blanking plug 60 may comprise one or more cap arms 61 which may be used to frictionally couple or to snap couple a chassis blanking plug 60 to the cassette 31 although any other suitable coupling method may be used.

While some exemplary shapes and sizes have been provided for elements of the system 100, it should be understood to one of ordinary skill in the art that the chassis 11, one or more cassettes 31, and any other element described herein may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

Additionally, while some materials have been provided, in other embodiments, the elements that comprise the system 100 may be made from or may comprise durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or may comprise durable and slightly flexible materials such as soft plastics, silicone, soft rubbers, or any other suitable materials including combinations of materials. In some embodiments, one or more of the elements that comprise the system 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the system 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the system 100 may be coupled by being one of connected to and integrally formed with another element of the system 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A pre-terminated cassette securing a data cable for use within a fiber optic patching system, the pre-terminated cassette comprising:
    a body having a first vertical surface, a second vertical surface, a lower surface, and an upper surface, wherein the first vertical surface, second vertical surface, lower surface, and upper surface are disposed between a front end and a back end;
    a front plate coupled to the front end, the front plate comprising a front plate aperture adapted to receive a cable connector and the front plate having a plate height dimension (PHD) and a plate length dimension (PLD);
    a strain relief anchor mounted to the body and coupled to a reinforcement cable which is connected to the data cable; and
    wherein the data cable is terminated at the cassette and extends outwardly away from the back end of the cassette.

2. The pre-terminated cassette of claim 1, wherein the plate height dimension (PHD) is approximately equal to the plate length dimension (PLD).

3. The pre-terminated cassette of claim 1, wherein the plate height dimension (PHD) is 90% to 110% relative to the plate length dimension (PLD).

4. The pre-terminated cassette of claim 1, wherein the plate height dimension (PHD) is greater than the plate length dimension (PLD).

5. The pre-terminated cassette of claim 1, wherein the plate height dimension (PHD) is greater than the plate length dimension (PLD) so that there are more front plate apertures stacked vertically than there are front plate apertures arranged horizontally.

6. The pre-terminated cassette of claim 1 further comprising a back plate coupled to the back end, the back plate comprising a back plate aperture receiving a portion of the data cable which is terminated within the cassette.

7. The pre-terminated cassette of claim 1, wherein the front end of the body is square shaped.

8. A cassette pulling system for securing a data cable within a fiber optic patching system, the cassette pulling system comprising:
    a cassette, the cassette having a body with a first vertical surface, a second vertical surface, a lower surface, and an upper surface, wherein the first vertical surface, second vertical surface, lower surface, and upper surface are disposed between a front end and a back end; and
    an eye cap configured to be removably coupled to the cassette and covering the front end of the cassette, the eye cap suitable for pulling the cassette in a forward direction.

9. The cassette pulling system of claim 8, wherein the eye cap comprises a cap aperture configured to engage with a pulling cable or pulling device.

10. The cassette pulling system of claim 9, wherein the cap aperture is formed by a cap arm.

11. The cassette pulling system of claim 9, wherein the eye cap is configured to frictionally couple to the cassette.

12. The cassette pulling system of claim 9, wherein the eye cap is configured to snap couple to the cassette.

13. The cassette pulling system of claim 9, wherein the eye cap has a tapered end.

14. The cassette pulling system of claim 13, wherein the tapered end terminates with a cap arm and cap aperture.

15. The cassette pulling system of claim 9, wherein the cassette is pre-terminated and coupled to a data cable and wherein the eye cap is adapted to facilitate the pulling of both the cassette and the data cable.

16. The cassette pulling system of claim 8, wherein the cassette further comprises a cap ridge.

17. The cassette pulling system of claim 16, wherein the eye cap is configured to couple with the cap ridge.

18. A pre-terminated cassette securing a data cable for use within a fiber optic patching system, the pre-terminated cassette comprising:
    a body having a first vertical surface, a second vertical surface, a lower surface, and an upper surface, wherein the first vertical surface, second vertical surface, lower surface, and upper surface are disposed between a front end and a back end;
    a front plate coupled to the front end, the front plate comprising;
        (i) a plate height dimension (PHD) with two or more vertically stacked front plate apertures;
        (ii) a plate length dimension (PLD) with less front plate apertures arranged horizontally than stacked vertically, the plate height dimension (PHD) greater than the plate length dimension (PLD); and
    a data cable terminated at the cassette and extending outwardly away from the back end of the cassette opposite to the front plate apertures.

* * * * *